United States Patent
Younkin et al.

(10) Patent No.: US 9,483,111 B2
(45) Date of Patent: Nov. 1, 2016

(54) TECHNIQUES TO IMPROVE VIEWING COMFORT FOR THREE-DIMENSIONAL CONTENT

(71) Applicant: Intel Corporation, Santa Clara, CA (US)

(72) Inventors: Audrey C. Younkin, Hillsboro, OR (US); Philip J. Corriveau, Forest Grove, OR (US); Rina A. Doherty, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 317 days.

(21) Appl. No.: 13/830,522

(22) Filed: Mar. 14, 2013

(65) Prior Publication Data

US 2014/0267231 A1 Sep. 18, 2014

(51) Int. Cl.
*G06F 3/01* (2006.01)
*H04N 13/00* (2006.01)

(52) U.S. Cl.
CPC .......... *G06F 3/013* (2013.01); *H04N 13/0033* (2013.01)

(58) Field of Classification Search
None
See application file for complete search history.

(56) References Cited

U.S. PATENT DOCUMENTS

| | | | |
|---|---|---|---|
| 3,956,579 A | 5/1976 | Doumit | |
| 4,625,290 A * | 11/1986 | White | 345/419 |
| 6,473,209 B1 | 10/2002 | Popovich | |
| 7,764,844 B2 | 7/2010 | Bouk et al. | |
| 8,917,309 B1 | 12/2014 | Westin | |
| 8,982,185 B1 | 3/2015 | Shastri et al. | |
| 2004/0117306 A1 | 6/2004 | Karaoguz et al. | |
| 2004/0174464 A1 | 9/2004 | MacInnis et al. | |
| 2004/0238732 A1 * | 12/2004 | State et al. | 250/250 |
| 2005/0219400 A1 | 10/2005 | Poulsen | |
| 2006/0126919 A1 | 6/2006 | Kitaura | |
| 2006/0232665 A1 * | 10/2006 | Schowengerdt et al. | 348/51 |
| 2008/0172706 A1 | 7/2008 | Robinson et al. | |
| 2008/0275763 A1 | 11/2008 | Tran et al. | |
| 2008/0316933 A1 | 12/2008 | Pastrana et al. | |
| 2009/0027384 A1 | 1/2009 | Karman et al. | |
| 2009/0031384 A1 | 1/2009 | Brooks | |
| 2009/0034426 A1 | 2/2009 | Luft | |

(Continued)

FOREIGN PATENT DOCUMENTS

| | | |
|---|---|---|
| CN | 102118629 | 7/2011 |
| CN | 10213389 | 8/2011 |

(Continued)

OTHER PUBLICATIONS

"Wikipedia, Computer Vision Syndrome", <http://en.wikipedia.org/wik/Computer_vision_syndrome>, Feb. 25, 2013, 2 pages, (author unknown).

(Continued)

*Primary Examiner* — Maurice L McDowell, Jr.

(57) ABSTRACT

Techniques to improve viewing comfort for three-dimensional (3D) content are described. In one embodiment, for example, an apparatus may comprise a processor circuit and a 3D graphics management module, and the 3D graphics management module may be operable by the processor circuit to generate first 3D graphics information corresponding to a 3D warm-up sequence for presentation by a 3D display, transmit the first 3D graphics information, and transmit second 3D graphics information corresponding to 3D content for presentation by the 3D display. Other embodiments are described and claimed.

25 Claims, 6 Drawing Sheets

(56) References Cited

U.S. PATENT DOCUMENTS

| | | |
|---|---|---|
| 2009/0142041 A1 | 6/2009 | Nagasawa et al. |
| 2009/0154902 A1 | 6/2009 | Ichinose |
| 2009/0160934 A1 | 6/2009 | Hendrickson et al. |
| 2009/0244269 A1 | 10/2009 | Watanabe et al. |
| 2010/0045780 A1 | 2/2010 | Kwon et al. |
| 2011/0022988 A1* | 1/2011 | Lee ................... 715/848 |
| 2011/0032338 A1 | 2/2011 | Raveendran et al. |
| 2011/0142309 A1* | 6/2011 | Zhang et al. ........... 382/128 |
| 2011/0157312 A1 | 6/2011 | Kawakami |
| 2011/0157482 A1 | 6/2011 | Adachi |
| 2011/0188704 A1 | 8/2011 | Radhakrishnan et al. |
| 2011/0200094 A1 | 8/2011 | Kalra |
| 2011/0239273 A1 | 9/2011 | Yang et al. |
| 2011/0265133 A1 | 10/2011 | Kure |
| 2011/0292061 A1 | 12/2011 | Mineo et al. |
| 2011/0304689 A1* | 12/2011 | Sezan et al. ............ 348/43 |
| 2011/0304708 A1 | 12/2011 | Ignatov |
| 2011/0321091 A1 | 12/2011 | Lee |
| 2012/0051326 A1 | 3/2012 | Yokota |
| 2012/0076399 A1 | 3/2012 | Yamaji et al. |
| 2012/0098831 A1 | 4/2012 | Kim |
| 2012/0108999 A1 | 5/2012 | Leininger et al. |
| 2012/0136273 A1 | 5/2012 | Michelson, Jr. |
| 2012/0198017 A1 | 8/2012 | LeVasseur et al. |
| 2012/0200668 A1 | 8/2012 | Maruyama et al. |
| 2012/0250152 A1* | 10/2012 | Larson et al. ........... 359/464 |
| 2012/0257795 A1 | 10/2012 | Kim et al. |
| 2012/0262549 A1 | 10/2012 | Ferguson |
| 2012/0300027 A1 | 11/2012 | Urisu |
| 2013/0002814 A1 | 1/2013 | Park et al. |
| 2013/0021327 A1* | 1/2013 | Hu ...................... 345/419 |
| 2013/0070202 A1 | 3/2013 | Yonezawa et al. |
| 2013/0076872 A1 | 3/2013 | Wang |
| 2013/0091519 A1 | 4/2013 | McLauchlan et al. |
| 2013/0166390 A1 | 6/2013 | Blow et al. |
| 2013/0215239 A1 | 8/2013 | Wang et al. |
| 2013/0250055 A1 | 9/2013 | Cho et al. |

FOREIGN PATENT DOCUMENTS

| | | |
|---|---|---|
| CN | 102316333 | 1/2012 |
| CN | 102724521 A | 10/2012 |
| CN | 102752616 A | 10/2012 |
| CN | 102892019 A | 1/2013 |
| JP | 2006340094 | 12/2006 |
| JP | 2012227653 | 11/2012 |
| WO | 2010079921 | 7/2010 |

OTHER PUBLICATIONS

"ProtectYourVision.org desktop notifications", <http://www.protectyourvision.org/>, (Author unknown, date unknown).

Heiting et al., "Computer Glasses: Relieving Computer Eye Strain", All About Vision, <http://www.allaboutvision.com/cvs/computer_glasses.htm>, Jan. 2012, 3 pages.

Webpage, "Blink Now", <http://blinknow.co.uk/index.php>, Feb. 27, 2013, 2 pages, (author unknown).

Simons et al., "Change blindness in the absence of visual disruption", Perception 2000, vol. 29, pp. 1143-1154.

Office Action received for U.S. Appl. No. 13/976,450, mailed Feb. 17, 2016, 23 pages.

Office Action received for Korean Patent Application No. 2015-7012188, mailed Feb. 24, 2016, 11 pages including 5 pages English translation.

Office Action received for U.S. Appl. No. 13/710,369, mailed Feb. 25, 2016, 38 pages.

* cited by examiner

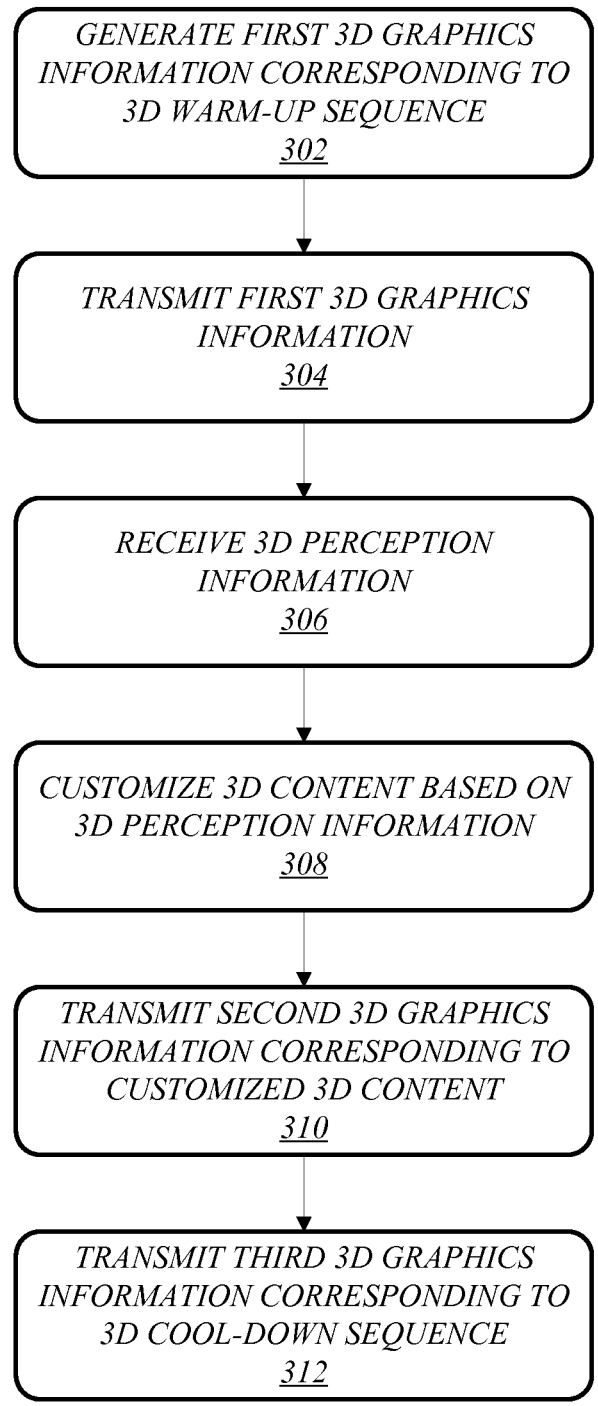

FIG. 5
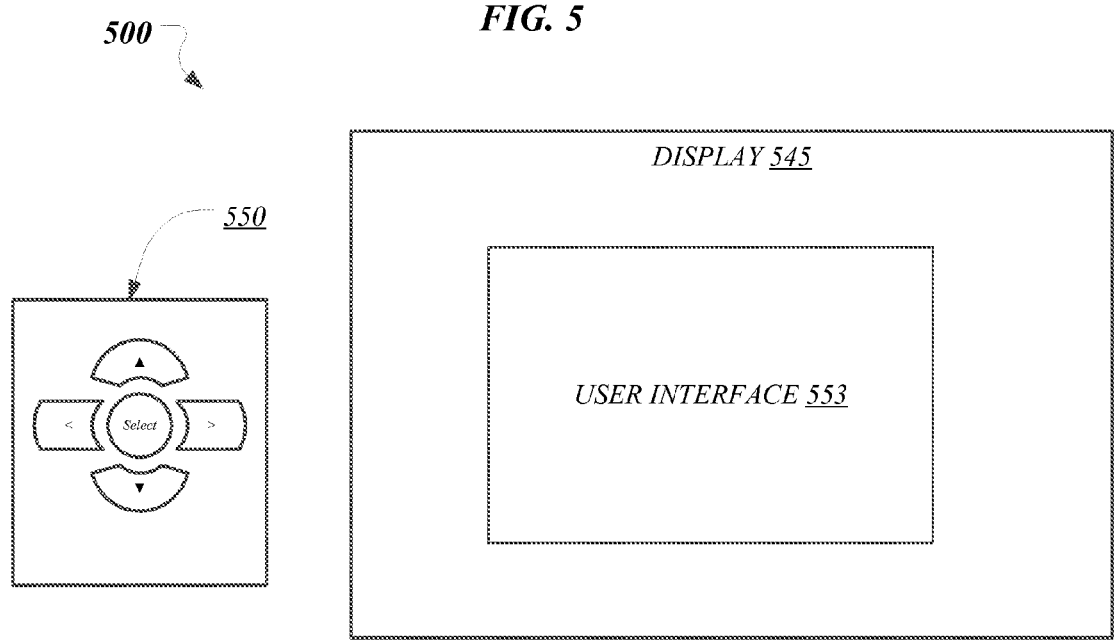
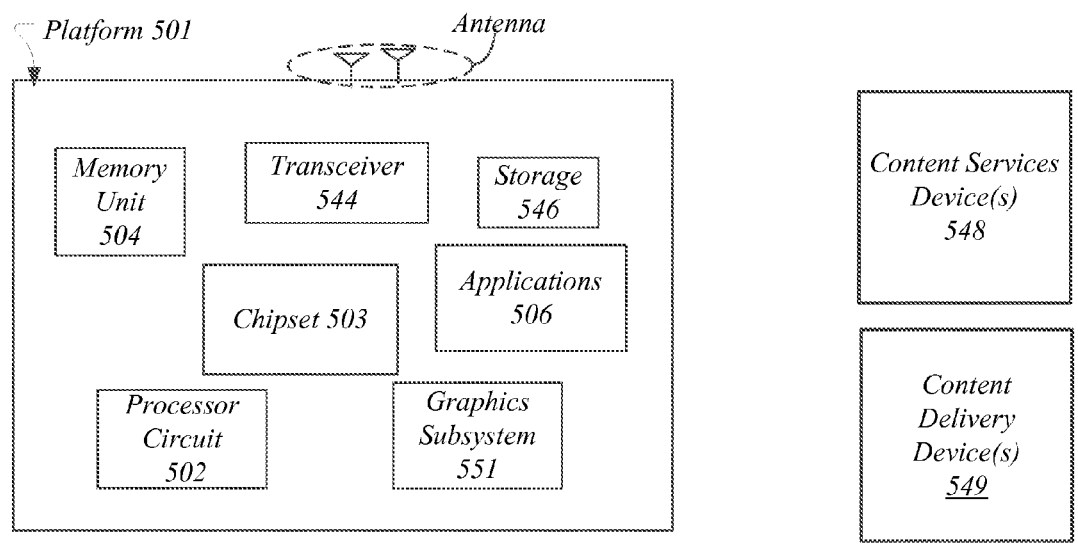

TECHNIQUES TO IMPROVE VIEWING COMFORT FOR THREE-DIMENSIONAL CONTENT

TECHNICAL FIELD

Embodiments described herein generally relate to the generation, display, and consumption of three-dimensional (3D) graphics.

BACKGROUND

Various conventional techniques exist for the generation of 3D visual effects. For example, some conventional systems utilize stereoscopic 3D technology, according to which two different images presented to the left and right eyes of a viewer differ from each other in a particular manner such that the viewer's brain interprets the visual information as a single image comprising 3D elements. Any particular portion of 3D content, when displayed, may present 3D elements of various apparent depths, which may change in position and/or apparent depth at various rates. The comfort experienced by a viewer of such particular content may depend on the ability of that viewer's eyes to appropriately process the 3D elements exhibiting those various depths and rates of motion.

The ability of a given viewer's eyes to appropriately process 3D elements may depend on the vergence and accommodation characteristics of that viewer's eyes. Vergence denotes the ability of a viewer's eyes to adjust their orientation to a common point in space corresponding to a particular depth by rotating towards each other or away from each other. Accommodation denotes the ability of a viewer's eyes to adjust their focal length to that particular depth.

BRIEF DESCRIPTION OF THE DRAWINGS

FIG. 3 illustrates one embodiment of a logic flow.

FIG. 5 illustrates one embodiment of a third system.

DETAILED DESCRIPTION

Various embodiments may be generally directed to techniques to improve viewing comfort for three-dimensional (3D) content. In one embodiment, for example, an apparatus may comprise a processor circuit and a 3D graphics management module, and the 3D graphics management module may be operable by the processor circuit to generate first 3D graphics information corresponding to a 3D warm-up sequence for presentation by a 3D display, transmit the first 3D graphics information, and transmit second 3D graphics information corresponding to 3D content for presentation by the 3D display. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
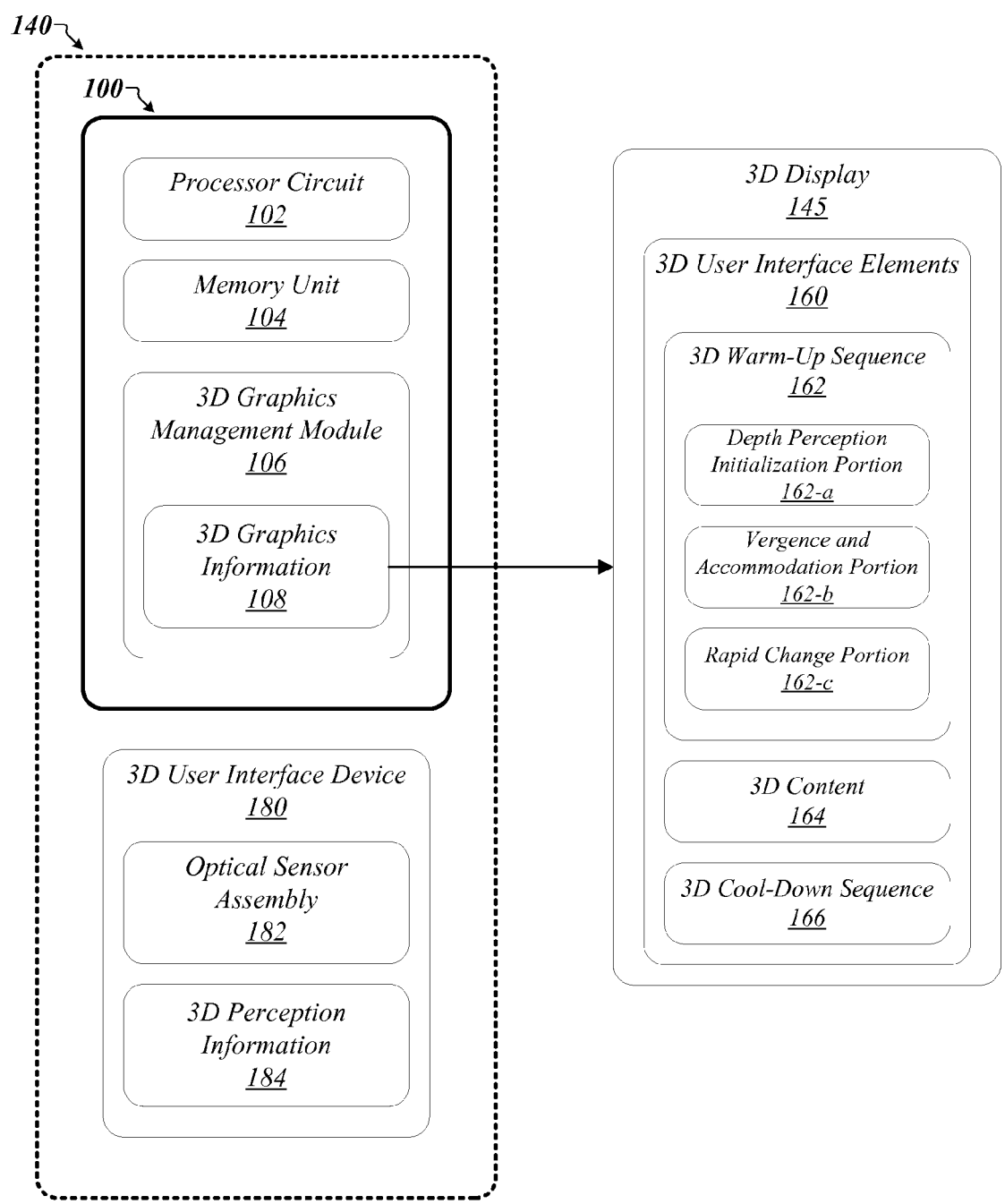
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor circuit 102, a memory unit 104, and a 3D graphics management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

In various embodiments, apparatus 100 may comprise 3D graphics management module 106. 3D graphics management module 106 may comprise logic or circuitry operative to process information, logic, or data received from processor circuit 102, memory unit 104, and/or one or more elements external to apparatus 100, and to generate 3D graphics information 108 based on the received information, logic, or data. 3D graphics information 108 may comprise information, logic, or data operative to cause a 3D display to display one or more 3D user interface elements. The embodiments are not limited in this context.

FIG. 1 also illustrates a block diagram of a system 140. System 140 may comprise any of the aforementioned elements of apparatus 100. System 140 may further comprise a 3D display 145. 3D display 145 may comprise any display device capable of displaying 3D user interface elements 160. 3D user interface elements 160 may comprise any 3D visual or optical sensory effect(s) such as, for example, images, pictures, video, text, graphics, menus, textures, and/or patterns. Examples for 3D display 145 may include a 3D television, a 3D monitor, a 3D projector, and a 3D computer screen. In one embodiment, for example, 3D display 145 may be implemented by a liquid crystal display (LCD) display, light emitting diode (LED) display, or other type of suitable visual interface feature 3D capabilities. 3D display 145 may comprise, for example, a touch-sensitive color display screen. In various implementations, 3D display 145 may comprise one or more thin-film transistors (TFT) LCDs including embedded transistors. In some embodiments, 3D display 145 may comprise a stereoscopic 3D display. In various other embodiments, 3D display 145 may comprise a holographic display or another type of display capable of creating 3D visual effects. The embodiments are not limited in this context.

In some embodiments, apparatus 100 and/or system 140 may be configurable to communicatively couple with a 3D user interface device 180. 3D user interface device 180 may comprise a device operable by a user of 3D display 145 to view 3D user interface elements 160 generated by 3D display 145. For example, in various embodiments in which 3D display 145 comprises a stereoscopic 3D display, 3D user interface device 180 may comprise a pair of stereoscopic 3D viewing glasses. In some embodiments, 3D user interface device 180 may comprise optical sensor assembly 182. Optical sensor assembly 182 may comprise one or more optical sensors operative to obtain 3D perception information 184 for a user of 3D user interface device 180. Such 3D perception information 184 may describe one or more characteristics of a user's ability to perceive 3D content. For example, if a user wears and/or utilizes 3D user interface device 180 while viewing particular 3D user interface elements 160 on 3D display 145, optical sensor assembly 182 may be operative to measure the user's visual vergence and/or accommodation exhibited in response to the various 3D user interface elements 160. It is worthy of note that 3D user interface device 180 may not necessarily be required in order that a user be able to see the 3D user interface elements 160 displayed on 3D display 145. For example, in various embodiments, 3D display 145 may comprise a holographic display capable of generating 3D user interface elements 160 that are visible to the naked eye without the need for a 3D viewing device. In such embodiments, 3D user interface device 180 may still be utilized in order to allow optical sensor assembly 182 to obtain 3D perception information 184 for the user. The embodiments are not limited in this context.

In general operation, apparatus 100 and/or system 140 may be operative to generate 3D graphics information 108 and to transmit it to 3D display 145. 3D display 145 may then be operative to display 3D user interface elements 160 based on the 3D graphics information 108. In some embodiments, apparatus 100 and/or system 140 may be operative to generate 3D graphics information 108 corresponding to a 3D warm-up sequence 162 and to transmit that 3D graphics information 108 to 3D display 145, which may then display the 3D warm-up sequence 162. In various embodiments, during or after the presentation of the 3D warm-up sequence on 3D display 145, apparatus 100 and/or system 140 may be operative to obtain 3D perception information 184 for a user viewing 3D warm-up sequence 162 on 3D display 145. In some such embodiments, apparatus 100 and/or system 140 may be operative to utilize 3D perception information 184 to customize subsequent 3D user interface elements 160 displayed on 3D display 145 for viewing by that user. In various embodiments, apparatus 100 and/or system 140 may be operative to generate 3D graphics information 108 corresponding to 3D content 164 and to transmit that 3D graphics information 108 to 3D display 145, which may then display the 3D content 164 following presentation of 3D warm-up sequence 162. In some embodiments, apparatus 100 and/or system 140 may be operative to generate 3D graphics information 108 corresponding to a 3D cool-down sequence 166 and to transmit that 3D graphics information 108 to 3D display 145, which may then display the 3D cool-down sequence following presentation of 3D content 164. The embodiments are not limited in this context.

In various embodiments, 3D graphics management module 106 may be operative to generate 3D graphics information 108 corresponding to 3D warm-up sequence 162. As employed herein, the term "3D warm-up sequence" is defined as a series of 3D user interface elements 160 presented on one or more 3D displays prior to presentation of subsequent 3D content 164 on the one or more 3D displays, and that is operative to transition the eyes of a viewer from natural binocular vision to viewing 3D effects on the one or more 3D displays. 3D warm-up sequence 162 may be designed to provide a gradual transition into viewing subsequent 3D content 164, and thus the viewer may avoid an abrupt switch from natural binocular vision to virtual 3D vision. An advantage of some embodiments may be that by viewing 3D warm-up sequence 162, the user's eyes are prepared or "stretched" for more comfortable viewing of the subsequent 3D content 164. For example, for some users, viewing 3D effects can create unusual left eye/right eye coupling that may cause inaccurate vergence and accommodation responses, resulting in ocular rivalry that leads to cognitive conflicts and visual processing confusion. In turn, these effects may cause symptoms of physical discomfort such as eye strain, eye dryness, headaches, and/or nausea. These symptoms may be especially prevalent following an abrupt change from natural binocular vision to viewing virtual 3D effects. By viewing 3D warm-up sequence 162, a user may realize a more gradual transition from natural vision to viewing subsequent 3D content 164 on 3D display 145. As a result, the aforementioned symptoms of physical discomfort may be mitigated, and the user may experience more comfortable viewing of the subsequent 3D content 164. Other advantages may be associated with various embodiments, and the embodiments are not limited in this context.

In some embodiments, 3D warm-up sequence 162 may comprise a series of 3D images and the apparent depths of 3D user interface elements 160 comprised therein may vary from 3D image to 3D image. For example, a particular 3D image within 3D warm-up sequence 162 may comprise an object depicted with an apparent depth equal to 20 seconds of arc, and a subsequent 3D image within 3D warm-up sequence 162 may comprise the same object and/or one or more different objects or elements depicted with an apparent depth equal to 40 seconds of arc. The embodiments are not limited to this example.

In various embodiments, 3D warm-up sequence 162 may comprise a depth perception initialization portion 162-a. During depth perception initialization portion 162-a, 3D display 145 may be operative to display a series of 3D images in which the apparent depth of a particular 3D user interface element 160 gradually changes. In some embodiments, the apparent depth of a particular 3D user interface element 160 may be stepped through a range of apparent depths one or more times, in decreasing order, increasing order, or both. For example, in various embodiments, a 3D user interface element 160 may be depicted with a distant apparent position at the beginning of depth perception initialization portion 162-a. This distant apparent position may correspond to a maximum apparent depth in the range of apparent depths. The apparent depth of the 3D user interface element 160 may then be gradually reduced until a minimum apparent depth in the range of apparent depths is reached. At this point, depth perception initialization portion 162-a may end in some embodiments. In various other embodiments, the apparent depth of the 3D user interface element 160 may then be gradually stepped back up through the range of apparent depths until it reaches the maximum apparent depth in the range. In an example embodiment, the apparent depth of the 3D user interface element 160 may be gradually decreased from approximately 20 seconds of arc to approximately 400 seconds of arc, and then gradually increased back up to 20 seconds of arc, at which point depth perception initialization portion 162-a may end. The embodiments are not limited to this example.

In some embodiments, 3D warm-up sequence 162 may comprise a vergence and accommodation portion 162-b. During vergence and accommodation portion 162-b, 3D display 145 may be operative to display a series of 3D user interface elements 160 with varying screen positions and apparent depths. For example, during vergence and accommodation portion 162-b, a first 3D user interface element 160 displayed in the upper left quadrant of 3D display 145 with an apparent depth of 40 seconds of arc may be followed by a second 3D user interface element 160 displayed in the lower right quadrant of 3D display 145 with an apparent depth of 120 seconds of arc. The series of 3D user interface elements 160 in vergence and accommodation portion 162-b may be displayed according to a transition rate for vergence and accommodation portion 162-b. The transition rate for vergence and accommodation portion 162-b may define a rate at which the progression through the series of 3D user interface elements 160 in vergence and accommodation portion 162-b occurs. For example, a transition rate for vergence and accommodation portion 162-b may have a value of 30 elements per minute, indicating that a new user interface element 160 is displayed every two seconds. The embodiments are not limited to this example.

In various embodiments, 3D warm-up sequence 162 may comprise a rapid change portion 162-c. During rapid change portion 162-c, 3D display 145 may be operative to display a quick progression of 3D user interface elements 160, which may also vary in screen position and apparent depth. The series of 3D user interface elements 160 in rapid change portion 162-c may be displayed according to a transition rate for rapid change portion 162-c. The transition rate for rapid change portion 162-c may define a rate at which the progression through the series of 3D user interface elements 160 in rapid change portion 162-c. In some embodiments, the transition rate for rapid change portion 162-c may be greater than that for vergence and accommodation portion 162-b. In an example embodiment in which the transition rate for vergence and accommodation portion 162-b is equal to 30 elements per minute, the transition rate for rapid change portion 162-c may be equal to 150 elements per minute. The embodiments are not limited in this context.

In various embodiments, 3D graphics management module 106 may be operative to transmit 3D graphics information 108 corresponding to 3D warm-up sequence 162 to 3D display 145. 3D display 145 may then be operative to display 3D user interface elements 160 comprising 3D warm-up sequence 162. In some embodiments, 3D display 145 may be operative to display 3D user interface elements 160 corresponding to depth perception initialization portion 162-a, 3D user interface elements 160 corresponding to vergence and accommodation portion 162-b, and/or 3D user interface elements 160 corresponding to rapid change portion 162-c. The embodiments are not limited in this context.

In various embodiments, information may be collected during 3D warm-up sequence 162 that may be used to further improve user comfort while viewing subsequent 3D content 164. For example, in some embodiments, a user may wear and/or utilize 3D user interface device 180 while viewing 3D warm-up sequence 162. In various such embodiments, 3D user interface device 180 may use optical sensor assembly 182 to obtain 3D perception information 184 while the user views 3D warm-up sequence 162. In some embodiments, optical sensor assembly 182 may be operative to track the motion of the user's eyes and generate 3D perception information 184 based on that motion. 3D perception information 184 may comprise information describing one or more characteristics of the user's ability to perceive 3D effects presented during part or all of 3D warm-up sequence 162. For example, 3D perception information 184 may comprise measurements of the user's visual vergence and/or accommodation exhibited in response to various 3D user interface elements 160 comprised within 3D warm-up sequence 162. The embodiments are not limited in this context.

In various embodiments, during depth perception initialization portion 162-a, optical sensor assembly 182 may be operative to generate 3D perception information 184 describing a user's ability to properly perceive 3D effects of various apparent depths. For example, as a 3D user interface element 160 is gradually moved through a range of apparent depths during depth perception initialization portion 162-a, optical sensor assembly 182 may be operative to track the motion of the user's eyes to determine whether the 3D user interface element 160 is properly perceived at each apparent depth. Optical sensor assembly 182 may then be operative to generate 3D perception information 184 indicating apparent depths that the user is capable of perceiving. In some embodiments, optical sensor assembly 182 may be operative to generate 3D perception information 184 describing a minimum and maximum apparent depth that the user is capable of perceiving. For example, optical sensor assembly 182 may be operative to generate 3D perception information 184 indicating that a particular user is capable of properly perceiving apparent depths ranging from 300 to 40 seconds of arc. The embodiments are not limited to this example.

In various embodiments, during vergence and accommodation portion 162-b, optical sensor assembly 182 may be operative to generate 3D perception information 184 describing a user's ability to properly perceive transitions between various screen positions and apparent depths. For example, as a series of 3D user interface elements 160 with varying screen positions and apparent depths is displayed during vergence and accommodation portion 162-b, optical sensor assembly 182 may be operative to track the motion of the user's eyes to determine whether each 3D user interface element 160 in the series is properly perceived. Optical sensor assembly 182 may then be operative to generate 3D perception information 184 indicating changes in apparent depths that the user is capable of perceiving. In some embodiments, for example, optical sensor assembly 182 may be operative to generate 3D perception information 184 indicating a maximum instantaneous change in apparent depth that the user is capable of perceiving. For example, optical sensor assembly 182 may be operative to generate 3D perception information 184 indicating that a particular user is capable of properly perceiving an instantaneous change in apparent depth of up to 200 seconds of arc. The embodiments are not limited to this example.

In various embodiments, during rapid change portion 162-c, optical sensor assembly 182 may be operative to generate 3D perception information 184 describing a speed at which a user is able to properly perceive transitions between various screen positions and apparent depths. For example, as a series of 3D user interface elements 160 with varying screen positions and apparent depths is rapidly displayed during rapid change portion 162-c, optical sensor assembly 182 may be operative to track the motion of the user's eyes to determine how quickly the eyes converge or diverge to and accommodate each successive focal point. Optical sensor assembly 182 may then be operative to generate 3D perception information 184 indicating rates of transition of which the user's eyes are capable. In some embodiments, for example, optical sensor assembly 182 may be operative to generate 3D perception information 184 indicating a preferred minimum time between apparent depth transitions. The embodiments are not limited to this example.

In various embodiments, 3D graphics management module 106 may be operative to receive 3D perception information 184 from 3D user interface device 180 and to customize subsequent 3D graphics information 108 based on 3D perception information 184. More particularly, in some embodiments, 3D graphics management module 106 may be operative to customize subsequent 3D graphics information 108 in order to apply one or more constraints to subsequently displayed 3D user interface elements 160. Such constraints may define allowable characteristics of subsequently displayed 3D user interface elements 160, and may be determined based on 3D perception information 184 in order to ensure that the subsequently displayed 3D user interface elements 160 can be properly perceived by the user. For example, in various embodiments, 3D graphics management module 106 may be operative to customize subsequent 3D graphics information 108 such that subsequently displayed 3D user interface elements 160 exhibit apparent depths within a range of apparent depths that is perceivable by the user. In another example, 3D graphics management module 106 may be operative to customize subsequent 3D graphics information 108 such that changes in the apparent depths of subsequently displayed 3D user interface elements 160 are not too large to be properly perceived by the user. In yet another example, 3D graphics management module 106 may be operative to customize subsequent 3D graphics information 108 such that changes in the apparent depths of subsequently displayed 3D user interface elements 160 are not too rapid to be properly perceived by the user. The embodiments are not limited to these examples.

In some embodiments, 3D graphics management module 106 may be operative to receive 3D perception information 184 while 3D warm-up sequence 162 is still in progress, and to customize remaining portions of 3D warm-up sequence 162 based on the received 3D perception information 184. For example, in various embodiments, 3D graphics management module 106 may be operative to receive 3D perception information 184 indicating a range of depths perceivable by a user upon the conclusion of depth perception initialization portion 162-a. 3D graphics management module 106 may then customize the 3D graphics information 108 generated during vergence and accommodation portion 162-b and/or rapid change portion 162-c such that the 3D user interface elements 160 displayed during those portions of 3D warm-up sequence 162 exhibit apparent depths within the range perceivable by the user. In a particular example embodiment, it may be determined during depth perception initialization portion 162-a that the user is unable to properly perceive apparent depths outside the range of 30-300 seconds of arc, and 3D graphics management module 106 may be operative to customize 3D graphics information 108 such that no 3D user interface elements 160 displayed during vergence and accommodation portion 162-b and/or rapid change portion 162-c exhibit apparent depths less than 30 seconds of arc or greater than 300 seconds of arc. The embodiments are not limited to this example.

In some embodiments, 3D graphics management module 106 may be operative to customize 3D content 164 displayed following the conclusion of 3D warm-up sequence 162 based on 3D perception information 184 collected during 3D warm-up sequence 162. In an example embodiment, upon conclusion of 3D warm-up sequence 162, apparatus 100 and/or system 140 may be operative to cause a 3D movie to be displayed on 3D display 145. In such an example embodiment, 3D graphics management module 106 may be operative to customize 3D graphics information 108 corresponding to the 3D movie such that 3D user interface elements 160 displayed during presentation of the 3D movie exhibit apparent depths within the range perceivable by the user, and that change by magnitudes and at rates that enable the user to properly perceive those 3D user interface elements 160. In a particular example embodiment, it may be determined during vergence and accommodation portion 162-b that the user cannot properly perceive 3D user interface elements 160 that exhibit instantaneous changes in apparent depth that exceed 200 seconds of arc, and 3D graphics management module 106 may be operative to customize 3D graphics information 108 such that no 3D user interface elements 160 displayed during presentation of the 3D movie exhibit instantaneous changes in apparent depth that exceed 200 seconds of arc. The embodiments are not limited to this example.

In various embodiments, 3D graphics management module 106 may be operative to generate 3D graphics information 108 corresponding to 3D user interface elements 160 comprising a 3D cool-down sequence 166. As employed herein, the term "3D cool-down sequence" is defined as a series of 3D user interface elements 160 presented on one or more 3D displays following presentation of 3D content 164 on the one or more 3D displays, and that is operative to transition the eyes of a viewer from viewing 3D effects on the one or more 3D displays back to natural binocular vision. 3D cool-down sequence 166 may comprise a series of 3D images in which the 3D effects are gradually reduced and then eliminated, such that a viewer experiences a gradual transition from 3D imagery back to a 2D viewing experience rather than an abrupt switch from virtual 3D vision to natural binocular vision. An advantage of some embodiments may be that by viewing 3D cool-down sequence 166, the user's eyes may be prepared for reversion to the 2D viewing experience, and symptoms of physical discomfort associated with abruptly switching from 3D to 2D viewing may be mitigated. Other advantages may be associated with various embodiments, and the embodiments are not limited in this context.

Figures 2A, 2B:
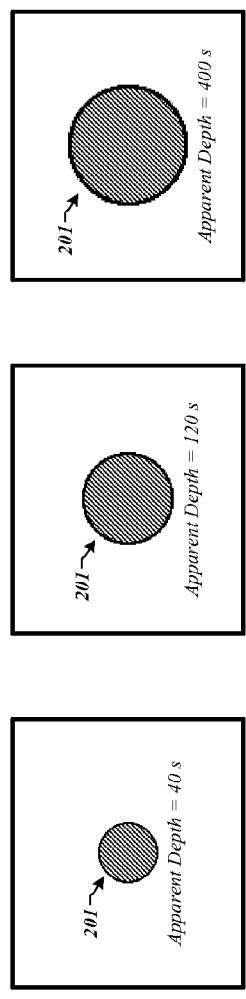
FIG. 2A illustrates one embodiment of a first image sequence.
FIG. 2B illustrates one embodiment of a second image sequence.

FIG. 2A illustrates one embodiment of a 3D image sequence 200 such as may comprise an example of a depth perception initialization portion 162-*a* within 3D warm-up sequence 162 in some embodiments. As shown in FIG. 2A, in 3D image 202, 3D user interface element 201 is depicted with an apparent depth of 40 seconds of arc. In 3D image 203, the apparent depth of 3D user interface element 201 has been stepped down to a value of 120 seconds of arc. In 3D image 204, the apparent depth of 3D user interface element 201 has once again been stepped down, this time to a value of 400 seconds of arc. Beginning with 3D image 205, the apparent depth of 3D user interface element 201 is increased, first to 120 seconds of arc in 3D image 205 and then to 40 seconds of arc in 3D image 206. Thus in the example embodiment illustrated in 3D image sequence 200, 3D user interface element 201 moves from a fairly distant position to a fairly close position, and then back to a fairly distant position. Other embodiments are both possible and contemplated however, and the embodiments are not limited in this context.

FIG. 2B illustrates one embodiment of a 3D image sequence 210 such as may comprise an example of a vergence and accommodation portion 162-*b* and/or a rapid change portion 162-*c* within 3D warm-up sequence 162 in various embodiments. As shown in FIG. 2B, in 3D image 212, a 3D user interface element 211 is depicted in the upper right portion of the image, with an apparent depth of 20 seconds of arc. In 3D image 214, a 3D user interface element 213 is depicted in the lower left portion of the image, with a significantly less distant apparent depth of 300 seconds of arc. In 3D image 216, a 3D user interface element 215 is depicted in the lower right portion of the image, with an intermediate apparent depth of 150 seconds of arc. The embodiments are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 3 illustrates one embodiment of a logic flow 300, which may be representative of the operations executed by one or more embodiments described herein. As shown in logic flow 300, first 3D graphics information corresponding to a 3D warm-up sequence may be generated at 302. For example, 3D graphics management module 106 of FIG. 1 may generate 3D graphics information 108 corresponding to 3D warm-up sequence 162. At 304, the first 3D graphics information may be transmitted. For example, 3D graphics management module 106 of FIG. 1 may transmit 3D graphics information 108 corresponding to 3D warm-up sequence 162 to 3D display 145. At 306, 3D perception information may be received. For example, 3D graphics management module 106 of FIG. 1 may receive 3D perception information 184. At 308, 3D content may be customized based on the 3D perception information. For example, 3D graphics management module 106 of FIG. 1 may customize 3D content 164 based on 3D perception information 184. At 310, second 3D graphics information corresponding to the customized 3D content may be transmitted. For example, 3D graphics management module 106 of FIG. 1 may transmit 3D graphics information 108 corresponding to customized 3D content 164. At 312, third 3D graphics information corresponding to a 3D cool-down sequence may be transmitted. For example, 3D graphics management module 106 of FIG. 1 may transmit 3D graphics information 108 corresponding to 3D cool-down sequence 166. The embodiments are not limited to these examples.

Figure 4:
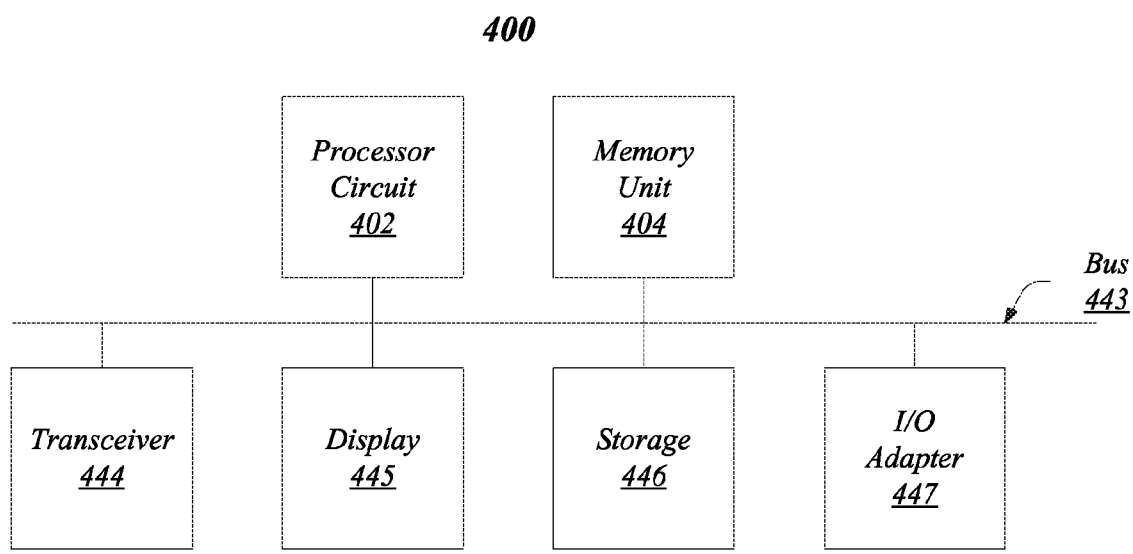
FIG. 4 illustrates one embodiment of a second system.

FIG. 4 illustrates one embodiment of a system 400. In various embodiments, system 400 may be representative of a system or architecture suitable for use with one or more embodiments described herein, such as apparatus 100 and/or system 140 of FIG. 1 and/or logic flow 300 of FIG. 3. The embodiments are not limited in this respect.

As shown in FIG. 4, system 400 may include multiple elements. One or more elements may be implemented using one or more circuits, components, registers, processors, software subroutines, modules, or any combination thereof, as desired for a given set of design or performance constraints. Although FIG. 4 shows a limited number of elements in a certain topology by way of example, it can be appreciated that more or less elements in any suitable topology may be used in system 400 as desired for a given implementation. The embodiments are not limited in this context.

In various embodiments, system 400 may include a processor circuit 402. Processor circuit 402 may be implemented using any processor or logic device, and may be the same as or similar to processor circuit 102 of FIG. 1.

In one embodiment, system 400 may include a memory unit 404 to couple to processor circuit 402. Memory unit 404 may be coupled to processor circuit 402 via communications bus 443, or by a dedicated communications bus between processor circuit 402 and memory unit 404, as desired for a given implementation. Memory unit 404 may be implemented using any machine-readable or computer-readable media capable of storing data, including both volatile and non-volatile memory, and may be the same as or similar to memory unit 104 of FIG. 1. In some embodiments, the machine-readable or computer-readable medium may comprise a non-transitory medium. The embodiments are not limited in this context.

In various embodiments, system 400 may include a transceiver 444. Transceiver 444 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 444 may operate in accordance with one or more applicable standards in any version. The embodiments are not limited in this context. The embodiments are not limited in this context.

In various embodiments, system 400 may include a display 445. Display 445 may constitute any display device capable of displaying information received from processor circuit 402. Examples for display 445 may include a television, a monitor, a projector, and a computer screen. In one embodiment, for example, display 445 may be implemented by a liquid crystal display (LCD), light emitting diode (LED) or other type of suitable visual interface. Display 445 may comprise, for example, a touch-sensitive color display screen. In various implementations, display 445 may comprise one or more thin-film transistors (TFT) LCD including embedded transistors. In some embodiments, display 445 may comprise a 3D display, and may be the same as or similar to 3D display 145 of FIG. 1. The embodiments are not limited in this context.

In various embodiments, system 400 may include storage 446. Storage 446 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 446 may include technology to increase the storage performance enhanced protection for valuable digital media when multiple hard drives are included, for example. Further examples of storage 446 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 400 may include one or more I/O adapters 447. Examples of I/O adapters 447 may include Universal Serial Bus (USB) ports/adapters, IEEE 1394 Firewire ports/adapters, and so forth. The embodiments are not limited in this context.

FIG. 5 illustrates an embodiment of a system 500. In various embodiments, system 500 may be representative of a system or architecture suitable for use with one or more embodiments described herein, such as apparatus 100 and/or system 140 of FIG. 1, logic flow 300 of FIG. 3, and/or system 400 of FIG. 4. The embodiments are not limited in this respect.

As shown in FIG. 5, system 500 may include multiple elements. One or more elements may be implemented using one or more circuits, components, registers, processors, software subroutines, modules, or any combination thereof, as desired for a given set of design or performance constraints. Although FIG. 5 shows a limited number of elements in a certain topology by way of example, it can be appreciated that more or less elements in any suitable topology may be used in system 500 as desired for a given implementation. The embodiments are not limited in this context.

In embodiments, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 500 includes a platform 501 coupled to a display 545. Platform 501 may receive content from a content device such as content services device(s) 548 or content delivery device(s) 549 or other similar content sources. A navigation controller 550 including one or more navigation features may be used to interact with, for example, platform 501 and/or display 545. Each of these components is described in more detail below.

In embodiments, platform 501 may include any combination of a processor circuit 502, chipset 503, memory unit 504, transceiver 544, storage 546, applications 506, and/or graphics subsystem 551. Chipset 503 may provide intercommunication among processor circuit 502, memory unit 504, transceiver 544, storage 546, applications 506, and/or graphics subsystem 551. For example, chipset 503 may include a storage adapter (not depicted) capable of providing intercommunication with storage 546.

Processor circuit 502 may be implemented using any processor or logic device, and may be the same as or similar to processor circuit 402 in FIG. 4.

Memory unit 504 may be implemented using any machine-readable or computer-readable media capable of storing data, and may be the same as or similar to memory unit 404 in FIG. 4.

Transceiver 544 may include one or more radios capable of transmitting and receiving signals using various suitable wireless communications techniques, and may be the same as or similar to transceiver 444 in FIG. 4.

Display 545 may include any television type monitor or display, and may be the same as or similar to display 445 in FIG. 4.

Storage 546 may be implemented as a non-volatile storage device, and may be the same as or similar to storage 446 in FIG. 4.

Graphics subsystem 551 may perform processing of images such as still or video for display. Graphics subsystem 551 may be a graphics processing unit (GPU) or a visual processing unit (VPU), for example. An analog or digital interface may be used to communicatively couple graphics subsystem 551 and display 545. For example, the interface may be any of a High-Definition Multimedia Interface, DisplayPort, wireless HDMI, and/or wireless HD compliant techniques. Graphics subsystem 551 could be integrated into processor circuit 502 or chipset 503. Graphics subsystem 551 could be a stand-alone card communicatively coupled to chipset 503.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 548 may be hosted by any national, international and/or independent service and thus accessible to platform 501 via the Internet, for example. Content services device(s) 548 may be coupled to platform 501 and/or to display 545. Platform 501 and/or content services device(s) 548 may be coupled to a network 552 to communicate (e.g., send and/or receive) media information to and from network 552. Content delivery device(s) 549 also may be coupled to platform 501 and/or to display 545.

In embodiments, content services device(s) 548 may include a cable television box, personal computer, network, telephone, Internet enabled devices or appliance capable of delivering digital information and/or content, and any other similar device capable of unidirectionally or bidirectionally communicating content between content providers and platform 501 and/display 545, via network 552 or directly. It will be appreciated that the content may be communicated unidirectionally and/or bidirectionally to and from any one of the components in system 500 and a content provider via network 552. Examples of content may include any media information including, for example, video, music, medical and gaming information, and so forth.

Content services device(s) 548 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 501 may receive control signals from navigation controller 550 having one or more navigation features. The navigation features of navigation controller 550 may be used to interact with a user interface 553, for example. In embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 550 may be echoed on a display (e.g., display 545) by movements of a pointer, cursor, focus ring, or other visual indicators displayed on the display. For example, under the control of software applications 506, the navigation features located on navigation controller 550 may be mapped to virtual navigation features displayed on user interface 553. In embodiments, navigation controller 550 may not be a separate component but integrated into platform 501 and/or display 545. Embodiments, however, are not limited to the elements or in the context shown or described herein.

In embodiments, drivers (not shown) may include technology to enable users to instantly turn on and off platform 501 like a television with the touch of a button after initial boot-up, when enabled, for example. Program logic may allow platform 501 to stream content to media adaptors or other content services device(s) 548 or content delivery device(s) 549 when the platform is turned "off." In addition, chip set 503 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 500 may be integrated. For example, platform 501 and content services device(s) 548 may be integrated, or platform 501 and content delivery device(s) 549 may be integrated, or platform 501, content services device(s) 548, and content delivery device(s) 549 may be integrated, for example. In various embodiments, platform 501 and display 545 may be an integrated unit. Display 545 and content service device(s) 548 may be integrated, or display 545 and content delivery device(s) 549 may be integrated, for example. These examples are not meant to limit the disclosed subject matter.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 501 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
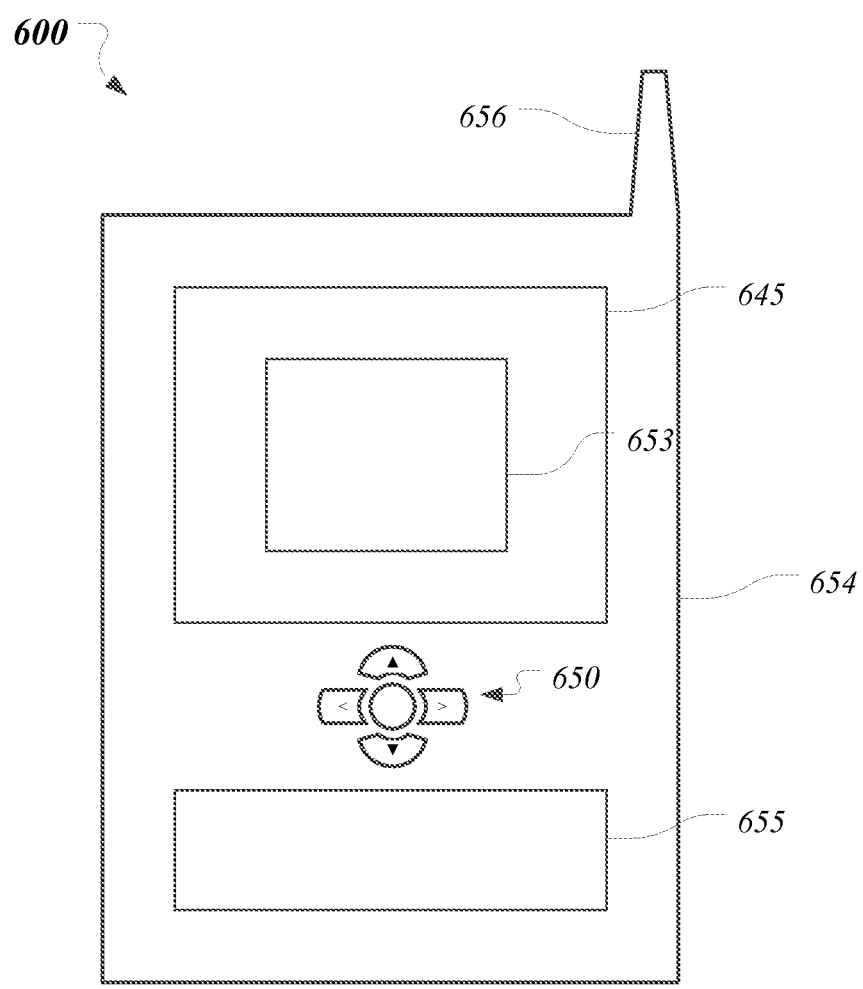
FIG. 6 illustrates one embodiment of a device.

As described above, system 500 may be embodied in varying physical styles or form factors. FIG. 6 illustrates embodiments of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a display 645, a navigation controller 650, a user interface 653, a housing 654, an I/O device 655, and an antenna 656. Display 645 may include any suitable display unit for displaying information appropriate for a mobile computing device, and may be the same as or similar to display 545 in FIG. 5. Navigation controller 650 may include one or more navigation features which may be used to interact with user interface 653, and may be the same as or similar to navigation controller 550 in FIG. 5. I/O device 655 may include any suitable I/O device for entering information into a mobile computing device. Examples for I/O device 655 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments.

Example 1 is at least one machine-readable medium comprising a plurality of graphics processing instructions that, in response to being executed on a computing device, cause the computing device to: generate first three-dimensional (3D) graphics information corresponding to a 3D warm-up sequence for presentation by a 3D display; cause transmission of the first 3D graphics information; and cause transmission of second 3D graphics information corresponding to 3D content for presentation by the 3D display following presentation of the 3D warm-up sequence.

In Example 2, the 3D warm-up sequence of Example 1 may optionally comprise a first portion during which the apparent depth of a 3D user interface element is stepped through a range of apparent depths.

In Example 3, the 3D warm-up sequence of any of Examples 1-2 may optionally comprise a second portion during which a series of 3D user interface elements that differ in screen position and apparent depth is displayed.

In Example 4, the 3D warm-up sequence of any of Examples 1-3 may optionally comprise a third portion during which a second series of 3D user interface elements that differ in screen position and apparent depth is displayed according to a transition rate that is greater than a transition rate for the second portion of the 3D warm-up sequence.

In Example 5, the at least one machine-readable medium of any of Examples 1-4 may optionally comprise instructions that, in response to being executed on a computing device, cause the computing device to: generate third 3D graphics information corresponding to a 3D cool-down sequence for presentation by the 3D display following presentation of the 3D content; and cause transmission of the third 3D graphics information.

In Example 6, the at least one machine-readable medium of any of Examples 1-5 may optionally comprise instructions that, in response to being executed on a computing device, cause the computing device to: receive 3D perception information describing abilities of a user to perceive 3D effects within the 3D warm-up sequence; and customize the 3D content based on the 3D perception information.

In Example 7, the at least one machine-readable medium of any of Examples 1-6 may optionally comprise instructions that, in response to being executed on a computing device, cause the computing device to: receive 3D perception information describing abilities of a user to perceive 3D effects within the 3D warm-up sequence; and customize one or more portions of the 3D warm-up sequence based on the 3D perception information.

In Example 8, the at least one machine-readable medium of any of Examples 1-7 may optionally comprise instructions that, in response to being executed on a computing device, cause the computing device to customize the 3D content based on 3D perception information indicating a minimum apparent depth that the user is capable of perceiving.

In Example 9, the at least one machine-readable medium of any of Examples 1-9 may optionally comprise instructions that, in response to being executed on a computing device, cause the computing device to customize the 3D content based on 3D perception information indicating a maximum apparent depth that the user is capable of perceiving.

In Example 10, the at least one machine-readable medium of any of Examples 1-9 may optionally comprise instructions that, in response to being executed on a computing device, cause the computing device to customize the 3D content based on 3D perception information indicating a maximum instantaneous change in apparent depth that the user is capable of perceiving.

In Example 11, the at least one machine-readable medium of any of Examples 1-10 may optionally comprise instructions that, in response to being executed on a computing device, cause the computing device to customize the 3D content based on 3D perception information indicating a preferred minimum time between apparent depth transitions.

In Example 12, the at least one machine-readable medium of any of Examples 1-11 may optionally comprise instructions that, in response to being executed on a computing device, cause the computing device to customize a 3D cool-down sequence based on 3D perception information indicating a minimum apparent depth that the user is capable of perceiving.

In Example 13, the at least one machine-readable medium of any of Examples 1-12 may optionally comprise instructions that, in response to being executed on a computing device, cause the computing device to customize a 3D cool-down sequence based on 3D perception information indicating a maximum apparent depth that the user is capable of perceiving.

In Example 14, the at least one machine-readable medium of any of Examples 1-13 may optionally comprise instructions that, in response to being executed on a computing device, cause the computing device to customize a 3D cool-down sequence based on 3D perception information indicating a maximum instantaneous change in apparent depth that the user is capable of perceiving.

In Example 15, the at least one machine-readable medium of any of Examples 1-14 may optionally comprise instructions that, in response to being executed on a computing device, cause the computing device to customize a 3D cool-down sequence based on 3D perception information indicating a preferred minimum time between apparent depth transitions.

Example 16 is a graphics processing apparatus, comprising: a processor circuit; and a three-dimensional (3D) graphics management module for execution on the processor circuit to: generate first three-dimensional (3D) graphics information corresponding to a 3D warm-up sequence for presentation by a 3D display, the 3D warm-up sequence comprising a first portion during which the apparent depth of a 3D user interface element is stepped through a range of apparent depths; send a control directive to cause transmission of the first 3D graphics information; and send a control directive to cause transmission of second 3D graphics information corresponding to 3D content for presentation by the 3D display following presentation of the 3D warm-up sequence.

In Example 17, the 3D warm-up sequence of Example 16 may optionally comprise a second portion during which a series of 3D user interface elements that differ in screen position and apparent depth is displayed.

In Example 18, the 3D warm-up sequence of Example 17 may optionally comprise a third portion during which a second series of 3D user interface elements that differ in screen position and apparent depth is displayed according to a transition rate that is greater than a transition rate for the second portion of the 3D warm-up sequence.

In Example 19, the 3D graphics management module of any of Examples 16-18 may optionally be for execution on the processor circuit to: receive 3D perception information describing abilities of a user to perceive 3D effects within the 3D warm-up sequence; and customize the 3D content based on the 3D perception information.

In Example 20, the 3D graphics management module of any of Examples 16-19 may optionally be for execution on the processor circuit to: generate third 3D graphics information corresponding to a 3D cool-down sequence for presentation by the 3D display following presentation of the 3D content; and send a control directive to cause transmission of the third 3D graphics information.

In Example 21, the 3D graphics management module of Example 20 may optionally be for execution on the processor circuit to: receive 3D perception information describing abilities of a user to perceive 3D effects within the 3D warm-up sequence; and customize the 3D cool-down sequence based on the 3D perception information.

In Example 22, the 3D graphics management module of any of Examples 16-21 may optionally be for execution on the processor circuit to customize the 3D content based on 3D perception information indicating a minimum apparent depth that the user is capable of perceiving.

In Example 23, the 3D graphics management module of any of Examples 16-22 may optionally be for execution on the processor circuit to customize the 3D content based on 3D perception information indicating a maximum apparent depth that the user is capable of perceiving.

In Example 24, the 3D graphics management module of any of Examples 16-23 may optionally be for execution on the processor circuit to customize the 3D content based on 3D perception information indicating a maximum instantaneous change in apparent depth that the user is capable of perceiving.

In Example 25, the 3D graphics management module of any of Examples 16-24 may optionally be for execution on the processor circuit to customize the 3D content based on 3D perception information indicating a preferred minimum time between apparent depth transitions.

In Example 26, the 3D graphics management module of any of Examples 16-25 may optionally be for execution on the processor circuit to customize a 3D cool-down sequence based on 3D perception information indicating a minimum apparent depth that the user is capable of perceiving.

In Example 27, the 3D graphics management module of any of Examples 16-26 may optionally be for execution on the processor circuit to customize a 3D cool-down sequence based on 3D perception information indicating a maximum apparent depth that the user is capable of perceiving.

In Example 28, the 3D graphics management module of any of Examples 16-27 may optionally be for execution on the processor circuit to customize a 3D cool-down sequence based on 3D perception information indicating a maximum instantaneous change in apparent depth that the user is capable of perceiving.

In Example 29, the 3D graphics management module of any of Examples 16-28 may optionally be for execution on the processor circuit to customize a 3D cool-down sequence based on 3D perception information indicating a preferred minimum time between apparent depth transitions.

In Example 30, the 3D graphics management module of any of Examples 16-29 may optionally be for execution on the processor circuit to customize one or more portions of the 3D warm-up sequence based on the 3D perception information.

Example 31 is a graphics processing method, comprising: generating first three-dimensional (3D) graphics information corresponding to a 3D warm-up sequence for presentation by a 3D display; sending a control directive to cause transmission of the first 3D graphics information; sending a control directive to cause transmission of second 3D graphics information corresponding to 3D content for presentation by the 3D display following presentation of the 3D warm-up sequence; sending a control directive to cause transmission of third 3D graphics information corresponding to a 3D cool-down sequence for presentation by the 3D display following presentation of the 3D content.

In Example 32, the 3D warm-up sequence of Example 31 may optionally comprise a first portion during which the apparent depth of a 3D user interface element is stepped through a range of apparent depths.

In Example 33, the 3D warm-up sequence of any of Examples 31-32 may optionally comprise a second portion during which a series of 3D user interface elements that differ in screen position and apparent depth is displayed.

In Example 34, the 3D warm-up sequence of any of Examples 31-33 may optionally comprise a third portion during which a second series of 3D user interface elements that differ in screen position and apparent depth is displayed according to a transition rate that is greater than a transition rate for the second portion of the 3D warm-up sequence.

In Example 35, the graphics processing method of any of Examples 31-34 may optionally comprise: receiving 3D perception information describing abilities of a user to perceive 3D effects within the 3D warm-up sequence; and customizing the 3D content based on the 3D perception information.

In Example 36, the graphics processing method of any of Examples 31-35 may optionally comprise: receiving 3D perception information describing abilities of a user to perceive 3D effects within the 3D warm-up sequence; and customizing one or both of the 3D warm-up sequence and the 3D cool-down sequence based on the 3D perception information.

In Example 37, the graphics processing method of any of Examples 31-36 may optionally comprise customizing the 3D content based on 3D perception information indicating a minimum apparent depth that the user is capable of perceiving.

In Example 38, the graphics processing method of any of Examples 31-37 may optionally comprise customizing the 3D content based on 3D perception information indicating a maximum apparent depth that the user is capable of perceiving.

In Example 39, the graphics processing method of any of Examples 31-38 may optionally comprise customizing the 3D content based on 3D perception information indicating a maximum instantaneous change in apparent depth that the user is capable of perceiving.

In Example 40, the graphics processing method of any of Examples 31-39 may optionally comprise customizing the 3D content based on 3D perception information indicating a preferred minimum time between apparent depth transitions.

In Example 41, the graphics processing method of any of Examples 31-40 may optionally comprise customizing the 3D cool-down sequence based on 3D perception information indicating a minimum apparent depth that the user is capable of perceiving.

In Example 42, the graphics processing method of any of Examples 31-41 may optionally comprise customizing the 3D cool-down sequence based on 3D perception information indicating a maximum apparent depth that the user is capable of perceiving.

In Example 43, the graphics processing method of any of Examples 31-42 may optionally comprise customizing the 3D cool-down sequence based on 3D perception information indicating a maximum instantaneous change in apparent depth that the user is capable of perceiving.

In Example 44, the graphics processing method of any of Examples 31-43 may optionally comprise customizing the 3D cool-down sequence based on 3D perception information indicating a preferred minimum time between apparent depth transitions.

In Example 45, the graphics processing method of any of Examples 31-44 may optionally comprise customizing one or both of the second portion and the third portion of the 3D warm-up sequence based on 3D perception information describing abilities of a user to perceive 3D effects within the 3D warm-up sequence.

In Example 46, at least one machine-readable medium may comprise a plurality of graphics processing instructions that, in response to being executed on a computing device, cause the computing device to perform a method according to any one of Examples 31 to 45.

In Example 47, a graphics processing apparatus may comprise means for performing a method according to any one of Examples 31 to 45.

In Example 48, a communications device may be arranged to perform a method according to any one of Examples 31 to 45.

Example 49 is a graphics processing system, comprising: a processor circuit; a transceiver; and a 3D graphics management module for execution on the processor circuit to: generate first three-dimensional (3D) graphics information corresponding to a 3D warm-up sequence for presentation by a 3D display, the 3D warm-up sequence comprising a first portion during which the apparent depth of a 3D user interface element is transitioned through a range of apparent depths; send a control directive to cause transmission of the first 3D graphics information; and send a control directive to cause transmission of second 3D graphics information corresponding to 3D content for presentation by the 3D display following presentation of the 3D warm-up sequence.

In Example 50, the 3D warm-up sequence of Example 49 may optionally comprise a second portion during which a series of 3D user interface elements that differ in screen position and apparent depth is displayed.

In Example 51, the 3D warm-up sequence of Example 50 may optionally comprise a third portion during which a second series of 3D user interface elements that differ in screen position and apparent depth is displayed according to a transition rate that is greater than a transition rate for the second portion of the 3D warm-up sequence.

In Example 52, the 3D graphics management module of any of Examples 49-51 may optionally be for execution on the processor circuit to: receive 3D perception information describing abilities of a user to perceive 3D effects within the 3D warm-up sequence from a 3D user interface device; and customize the 3D content based on the 3D perception information.

In Example 53, the 3D graphics management module of any of Examples 49-52 may optionally be for execution on the processor circuit to: generate third 3D graphics information corresponding to a 3D cool-down sequence for presentation by the 3D display following presentation of the 3D content; and send a control directive to cause transmission of the third 3D graphics information.

In Example 54, the 3D graphics management module of Example 53 may optionally be for execution on the processor circuit to: receive 3D perception information describing abilities of a user to perceive 3D effects within the 3D warm-up sequence from a 3D user interface device; and customize the 3D cool-down sequence based on the 3D perception information.

In Example 55, the 3D graphics management module of any of Examples 49-54 may optionally be for execution on the processor circuit to customize the 3D content based on 3D perception information indicating a minimum apparent depth that the user is capable of perceiving.

In Example 56, the 3D graphics management module of any of Examples 49-55 may optionally be for execution on the processor circuit to customize the 3D content based on 3D perception information indicating a maximum apparent depth that the user is capable of perceiving.

In Example 57, the 3D graphics management module of any of Examples 49-56 may optionally be for execution on the processor circuit to customize the 3D content based on 3D perception information indicating a maximum instantaneous change in apparent depth that the user is capable of perceiving.

In Example 58, the 3D graphics management module of any of Examples 49-57 may optionally be for execution on the processor circuit to customize the 3D content based on 3D perception information indicating a preferred minimum time between apparent depth transitions.

In Example 59, the 3D graphics management module of any of Examples 49-58 may optionally be for execution on the processor circuit to customize a 3D cool-down sequence based on 3D perception information indicating a minimum apparent depth that the user is capable of perceiving.

In Example 60, the 3D graphics management module of any of Examples 49-59 may optionally be for execution on the processor circuit to customize a 3D cool-down sequence based on 3D perception information indicating a maximum apparent depth that the user is capable of perceiving.

In Example 61, the 3D graphics management module of any of Examples 49-60 may optionally be for execution on the processor circuit to customize a 3D cool-down sequence based on 3D perception information indicating a maximum instantaneous change in apparent depth that the user is capable of perceiving.

In Example 62, the 3D graphics management module of any of Examples 49-61 may optionally be for execution on the processor circuit to customize a 3D cool-down sequence based on 3D perception information indicating a preferred minimum time between apparent depth transitions.

In Example 63, the 3D graphics management module of any of Examples 49-62 may optionally be for execution on the processor circuit to customize one or more portions of the 3D warm-up sequence based on 3D perception information describing abilities of a user to perceive 3D effects within the 3D warm-up sequence.

Example 64 is a graphics processing apparatus, comprising: means for generating first three-dimensional (3D) graphics information corresponding to a 3D warm-up sequence for presentation by a 3D display; means for sending a control directive to cause transmission of the first 3D graphics information; means for sending a control directive to cause transmission of second 3D graphics information corresponding to 3D content for presentation by the 3D display following presentation of the 3D warm-up sequence; means for sending a control directive to cause transmission of third 3D graphics information corresponding to a 3D cool-down sequence for presentation by the 3D display following presentation of the 3D content.

In Example 65, the 3D warm-up sequence of Example 64 may optionally comprise a first portion during which the apparent depth of a 3D user interface element is stepped through a range of apparent depths.

In Example 66, the 3D warm-up sequence of Example 65 may optionally comprise a second portion during which a series of 3D user interface elements that differ in screen position and apparent depth is displayed.

In Example 67, the 3D warm-up sequence of Example 66 may optionally comprise a third portion during which a second series of 3D user interface elements that differ in screen position and apparent depth is displayed according to a transition rate that is greater than a transition rate for the second portion of the 3D warm-up sequence.

In Example 68, the graphics processing apparatus of any of Examples 64-67 may optionally comprise: means for receiving 3D perception information describing abilities of a user to perceive 3D effects within the 3D warm-up sequence; and means for customizing the 3D content based on the 3D perception information.

In Example 69, the graphics processing apparatus of any of Examples 64-68 may optionally comprise: means for receiving 3D perception information describing abilities of a user to perceive 3D effects within the 3D warm-up sequence; and means for customizing one or both of the 3D warm-up sequence and the 3D cool-down sequence based on the 3D perception information.

In Example 70, the graphics processing apparatus of any of Examples 64-69 may optionally comprise means for customizing the 3D content based on 3D perception information indicating a minimum apparent depth that the user is capable of perceiving.

In Example 71, the graphics processing apparatus of any of Examples 64-70 may optionally comprise means for customizing the 3D content based on 3D perception information indicating a maximum apparent depth that the user is capable of perceiving.

In Example 72, the graphics processing apparatus of any of Examples 64-71 may optionally comprise means for customizing the 3D content based on 3D perception information indicating a maximum instantaneous change in apparent depth that the user is capable of perceiving.

In Example 73, the graphics processing apparatus of any of Examples 64-72 may optionally comprise means for customizing the 3D content based on 3D perception information indicating a preferred minimum time between apparent depth transitions.

In Example 74, the graphics processing apparatus of any of Examples 64-73 may optionally comprise means for customizing the 3D cool-down sequence based on 3D perception information indicating a minimum apparent depth that the user is capable of perceiving.

In Example 75, the graphics processing apparatus of any of Examples 64-74 may optionally comprise means for customizing the 3D cool-down sequence based on 3D perception information indicating a maximum apparent depth that the user is capable of perceiving.

In Example 76, the graphics processing apparatus of any of Examples 64-75 may optionally comprise means for customizing the 3D cool-down sequence based on 3D perception information indicating a maximum instantaneous change in apparent depth that the user is capable of perceiving.

In Example 77, the graphics processing apparatus of any of Examples 64-76 may optionally comprise means for customizing the 3D cool-down sequence based on 3D perception information indicating a preferred minimum time between apparent depth transitions.

In Example 78, the graphics processing apparatus of any of Examples 64-77 may optionally comprise means for customizing one or both of the second portion and the third portion of the 3D warm-up sequence based on 3D perception information describing abilities of a user to perceive 3D effects within the 3D warm-up sequence.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a plurality of instructions that, in response to being executed on a computing device, cause the computing device to:
   generate first three-dimensional (3D) graphics information corresponding to a 3D warm-up sequence for presentation by a 3D display;
   cause transmission of the first 3D graphics information; and
   cause transmission of second 3D graphics information corresponding to 3D content for presentation by the 3D display following presentation of the 3D warm-up sequence.

2. The at least one non-transitory machine-readable medium of claim 1, the 3D warm-up sequence comprising a first portion during which an apparent depth of a 3D user interface element is stepped through a range of apparent depths.

3. The at least one non-transitory machine-readable medium of claim 2, the 3D warm-up sequence comprising a second portion during which a series of 3D user interface elements that differ in screen position and apparent depth is displayed.

4. The at least one non-transitory machine-readable medium of claim 3, the 3D warm-up sequence comprising a third portion during which a second series of 3D user interface elements that differ in screen position and apparent depth is displayed according to a transition rate that is greater than a transition rate for the second portion of the 3D warm-up sequence.

5. The at least one non-transitory machine-readable medium of claim 1, comprising instructions that, in response to being executed on a computing device, cause the computing device to:

generate third 3D graphics information corresponding to a 3D cool-down sequence for presentation by the 3D display following presentation of the 3D content; and cause transmission of the third 3D graphics information.

6. The at least one non-transitory machine-readable medium of claim 1, comprising instructions that, in response to being executed on a computing device, cause the computing device to:

receive 3D perception information describing abilities of a user to perceive 3D effects within the 3D warm-up sequence; and customize the 3D content based on the 3D perception information.

7. The at least one non-transitory machine-readable medium of claim 1, comprising instructions that, in response to being executed on a computing device, cause the computing device to:

receive 3D perception information describing abilities of a user to perceive 3D effects within the 3D warm-up sequence; and customize one or more portions of the 3D warm-up sequence based on the 3D perception information.

8. An apparatus, comprising:

a processor circuit; and a three-dimensional (3D) graphics management module for execution on the processor circuit to:

generate first three-dimensional (3D) graphics information corresponding to a 3D warm-up sequence for presentation by a 3D display, the 3D warm-up sequence comprising a first portion during which an apparent depth of a 3D user interface element is stepped through a range of apparent depths;

send a control directive to cause transmission of the first 3D graphics information; and send a control directive to cause transmission of second 3D graphics information corresponding to 3D content for presentation by the 3D display following presentation of the 3D warm-up sequence.

9. The apparatus of claim 8, the 3D warm-up sequence comprising a second portion during which a series of 3D user interface elements that differ in screen position and apparent depth is displayed.

10. The apparatus of claim 9, the 3D warm-up sequence comprising a third portion during which a second series of 3D user interface elements that differ in screen position and apparent depth is displayed according to a transition rate that is greater than a transition rate for the second portion of the 3D warm-up sequence.

11. The apparatus of claim 8, the 3D graphics management module for execution on the processor circuit to:

receive 3D perception information describing abilities of a user to perceive 3D effects within the 3D warm-up sequence; and customize the 3D content based on the 3D perception information.

12. The apparatus of claim 8, the 3D graphics management module for execution on the processor circuit to:

generate third 3D graphics information corresponding to a 3D cool-down sequence for presentation by the 3D display following presentation of the 3D content; and send a control directive to cause transmission of the third 3D graphics information.

13. The apparatus of claim 12, the 3D graphics management module for execution on the processor circuit to:

receive 3D perception information describing abilities of a user to perceive 3D effects within the 3D warm-up sequence; and customize the 3D cool-down sequence based on the 3D perception information.

14. A method, comprising:

generating first three-dimensional (3D) graphics information corresponding to a 3D warm-up sequence for presentation by a 3D display;

sending a control directive to cause transmission of the first 3D graphics information;

sending a control directive to cause transmission of second 3D graphics information corresponding to 3D content for presentation by the 3D display following presentation of the 3D warm-up sequence;

sending a control directive to cause transmission of third 3D graphics information corresponding to a 3D cool-down sequence for presentation by the 3D display following presentation of the 3D content.

15. The method of claim 14, the 3D warm-up sequence comprising a first portion during which an apparent depth of a 3D user interface element is stepped through a range of apparent depths.

16. The method of claim 15, the 3D warm-up sequence comprising a second portion during which a series of 3D user interface elements that differ in screen position and apparent depth is displayed.

17. The method of claim 16, the 3D warm-up sequence comprising a third portion during which a second series of 3D user interface elements that differ in screen position and apparent depth is displayed according to a transition rate that is greater than a transition rate for the second portion of the 3D warm-up sequence.

18. The method of claim 14, comprising:

receiving 3D perception information describing abilities of a user to perceive 3D effects within the 3D warm-up sequence; and customizing the 3D content based on the 3D perception information.

19. The method of claim 14, comprising:

receiving 3D perception information describing abilities of a user to perceive 3D effects within the 3D warm-up sequence; and customizing one or both of the 3D warm-up sequence and the 3D cool-down sequence based on the 3D perception information.

20. A system, comprising:

a processor circuit;

a transceiver; and a 3D graphics management module for execution on the processor circuit to:

generate first three-dimensional (3D) graphics information corresponding to a 3D warm-up sequence for presentation by a 3D display, the 3D warm-up sequence comprising a first portion during which an apparent depth of a 3D user interface element is transitioned through a range of apparent depths;

send a control directive to cause transmission of the first 3D graphics information; and send a control directive to cause transmission of second 3D graphics information corresponding to 3D content for presentation by the 3D display following presentation of the 3D warm-up sequence.

21. The system of claim 20, the 3D warm-up sequence comprising a second portion during which a series of 3D user interface elements that differ in screen position and apparent depth is displayed.

22. The system of claim 21, the 3D warm-up sequence comprising a third portion during which a second series of 3D user interface elements that differ in screen position and apparent depth is displayed according to a transition rate that is greater than a transition rate for the second portion of the 3D warm-up sequence.

23. The system of claim 20, the 3D graphics management module for execution on the processor circuit to:
receive 3D perception information describing abilities of a user to perceive 3D effects within the 3D warm-up sequence from a 3D user interface device; and
customize the 3D content based on the 3D perception information.

24. The system of claim 20, the 3D graphics management module for execution on the processor circuit to:
generate third 3D graphics information corresponding to a 3D cool-down sequence for presentation by the 3D display following presentation of the 3D content; and
send a control directive to cause transmission of the third 3D graphics information.

25. The system of claim 24, the 3D graphics management module for execution on the processor circuit to:
receive 3D perception information describing abilities of a user to perceive 3D effects within the 3D warm-up sequence from a 3D user interface device; and
customize the 3D cool-down sequence based on the 3D perception information.

\* \* \* \* \*